United States Patent Office.

JOHN GREGORY, OF MARION, OHIO.

Letters Patent No. 61,063, dated January 8, 1867.

IMPROVED MEDICAL COMPOUND.

The Schedule referred to in these Letters Patent and making part of the same.

TO ALL WHOM IT MAY CONCERN:

Be it known that I, JOHN GREGORY, of Marion, in the county of Marion, and in the State of Ohio, have invented certain Medical Oil for the Cure of Consumptive Diseases, Palpitation of the Heart, Inflammatory Rheumatism, Liver and Kidney Diseases; and do hereby declare that the following is a full, clear, and exact description thereof.

My invention has for its object, in main, the cure of consumptive diseases. By experiments I have ascertained beyond peradventure that the application of petroleum oil, either by inhalation or by internal application, is the most searching and penetrating chemical for the above purposes. This oil must be secured directly from the pipes before the air has reached or acted upon it, so that the gas thereof is carefully preserved. This oil, for inhalation, is best without the ingredients, but for internal application and cures of the ulcers and other diseases, I add, to (for instance) one (1) oz. of the crude oil two drops ext. dandelion, two (2) drops extract of borax, and four (4) drops of Dr. Sanford's Liver Invigorator.

The above should be well shaken and used as follows: The consumptive patient should first inhale the petroleum medical oil for about five minutes, and then take a dose of the admixture above of about twenty drops to one-half a teaspoonful, twice a day, (once before retiring in the evening, and again after arising in the morning.) This will cause immense expectoration from the pipes and lungs of the most distant secretions, and cause almost instant relief. The healing qualities of the oil produce and cause a healing of the inflammation of ulcers on the lungs, and at the same time act as a cathartic on the bowels, thereby removing inflammation from the liver, kidneys, and blood. The dissolved borax is used in quantities of about ten (10) drops, in cases of bronchitis, for the purpose of destroying the inflammation of glands. The extract of dandelion (about fifteen drops) applied with the oil is an effectual cure for the diseases of the kidneys. Dr. Sanford's Liver Invigorator, (manufactured in New York city,) used in quantities of about twenty drops in connection with oil, is used in cases of disordered stomach, and has been found to be invaluable in carrying off the mucus and phlegm from the stomach, lungs, and liver.

What I desire to claim, and secure by Letters Patent, is—

1. The application of petroleum oil, produced directly from the pipes of the well, with its natural gases, as and for the purposes specified.

2. The use of the above-described chemicals in the manner substantially as and for the purposes set forth.

In testimony that I claim the foregoing I have hereunto set my hand and seal this 21st day of November, 1866.

JOHN GREGORY.

Witnesses:
J. H. BARKER,
JOHN R. PRITCHARD.